US012570829B2

(12) United States Patent
Ruemer et al.

(10) Patent No.: US 12,570,829 B2
(45) Date of Patent: Mar. 10, 2026

(54) PIPE MADE OF PEROXIDE-CROSSLINKED POLYETHYLENE OF HIGH UV STABILITY

(71) Applicant: BOREALIS AG, Vienna (AT)

(72) Inventors: Franz Ruemer, Linz (AT); Reinhold Gard, Stenungsund (SE); Stefan Dreckoetter, Burghausen (DE)

(73) Assignee: Borealis AG, Vienna (AT)

(*) Notice: Subject to any disclaimer, the term of this patent is extended or adjusted under 35 U.S.C. 154(b) by 398 days.

(21) Appl. No.: 17/622,891

(22) PCT Filed: Jun. 16, 2020

(86) PCT No.: PCT/EP2020/066582
§ 371 (c)(1),
(2) Date: Dec. 27, 2021

(87) PCT Pub. No.: WO2021/001143
PCT Pub. Date: Jan. 7, 2021

(65) Prior Publication Data

US 2022/0227965 A1 Jul. 21, 2022

(30) Foreign Application Priority Data

Jul. 1, 2019 (EP) .................................... 19183634

(51) Int. Cl.

| | |
|---|---|
| ***C08K 5/3492*** | (2006.01) |
| ***C08J 3/24*** | (2006.01) |
| ***C08K 5/134*** | (2006.01) |
| ***C08K 5/14*** | (2006.01) |
| ***F16L 9/12*** | (2006.01) |

(52) U.S. Cl.
CPC ............. *C08K 5/34926* (2013.01); *C08J 3/24* (2013.01); *C08K 5/1345* (2013.01); *C08K 5/14* (2013.01); *F16L 9/12* (2013.01); *C08J 2323/04* (2013.01)

(58) Field of Classification Search
None
See application file for complete search history.

(56) References Cited

U.S. PATENT DOCUMENTS

| | | | | |
|---|---|---|---|---|
| 6,455,616 | B1 | 9/2002 | Cogen | |
| 6,828,364 | B2 * | 12/2004 | Gugumus | C08K 5/34926 252/182.13 |
| 7,744,972 | B2 * | 6/2010 | Ho | F16L 11/06 428/36.9 |
| 8,247,696 | B2 * | 8/2012 | Smedberg | C08K 5/01 174/120 SC |
| 9,637,602 | B2 | 5/2017 | Potter et al. | |
| 9,670,293 | B2 | 6/2017 | Reznichenko et al. | |
| 9,670,347 | B2 | 6/2017 | Tölsch et al. | |
| 9,708,481 | B2 | 7/2017 | Wang et al. | |
| 9,745,431 | B2 | 8/2017 | Potter et al. | |
| 9,751,962 | B2 | 9/2017 | Wang et al. | |
| 9,777,142 | B2 | 10/2017 | Sandholzer et al. | |
| 9,802,394 | B2 | 10/2017 | Cavacas et al. | |
| 9,828,698 | B2 | 11/2017 | Wang et al. | |
| 9,890,275 | B2 | 2/2018 | Sandholzer et al. | |
| 9,976,020 | B2 | 5/2018 | Nummila-Pakarinen et al. | |
| 10,011,708 | B2 | 7/2018 | Lampela et al. | |
| 10,030,109 | B2 | 7/2018 | Boragno et al. | |
| 10,040,930 | B2 | 8/2018 | Gloger et al. | |
| 10,100,185 | B2 | 10/2018 | Wang et al. | |
| 10,100,186 | B2 | 10/2018 | Wang et al. | |
| 10,227,427 | B2 | 3/2019 | Reichelt et al. | |
| 10,450,451 | B2 | 10/2019 | Wang et al. | |
| 10,519,259 | B2 | 12/2019 | Resconi et al. | |
| 10,870,718 | B2 | 12/2020 | Denifl et al. | |
| 11,292,900 | B2 | 4/2022 | Gahleitner et al. | |
| 11,299,617 | B2 | 4/2022 | Prieto et al. | |
| 11,390,732 | B2 | 7/2022 | Van Houcke et al. | |

(Continued)

FOREIGN PATENT DOCUMENTS

| | | | |
|---|---|---|---|
| CN | 106633315 A | | 5/2017 |
| JP | 01288425 A | * | 11/1989 |

(Continued)

OTHER PUBLICATIONS

Google machine translation of JP 01288425 (2024, 6pages).*
WIPO machine translation of JP '01288425 (2024, 3 pages).*
Machine translation of JP 2012162645-A (2012, 7 pages).*
Machine translation of JP 2017066332-A (2017, 27 pages).*

(Continued)

*Primary Examiner* — Brieann R Johnston

(74) *Attorney, Agent, or Firm* — Leydig, Voit & Mayer, Ltd.

(57) ABSTRACT

The present invention relates to a pipe which comprises (i) a peroxide-crosslinked polyethylene, and (ii) a sterically hindered amine which comprises the following repeating unit of formula (I).

(I)

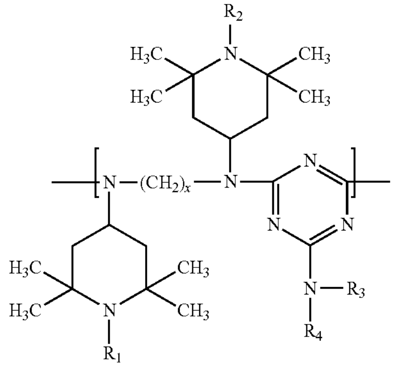

14 Claims, No Drawings

(56) References Cited

U.S. PATENT DOCUMENTS

| | | | |
|---|---|---|---|
| 11,492,478 B2 | 11/2022 | Kniesel et al. | |
| 11,504,949 B2 | 11/2022 | Oderkerk et al. | |
| 11,518,863 B2 | 12/2022 | Vijay | |
| 11,530,321 B2 | 12/2022 | Kniesel et al. | |
| 2003/0225191 A1* | 12/2003 | Gugumus | C08K 5/34 524/99 |
| 2005/0148700 A1* | 7/2005 | Kramer | C08K 5/1515 524/99 |
| 2010/0149607 A1 | 6/2010 | Langrel et al. | |
| 2012/0125469 A1 | 5/2012 | Ericsson et al. | |
| 2012/0295048 A1 | 11/2012 | Al-Malaika et al. | |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0229158 A1 | 8/2016 | Cavacas et al. | |
| 2016/0237270 A1 | 8/2016 | Wang et al. | |
| 2016/0244539 A1 | 8/2016 | Resconi et al. | |
| 2016/0272740 A1 | 9/2016 | Wang et al. | |
| 2016/0280899 A1 | 9/2016 | Töltsch et al. | |
| 2016/0304681 A1 | 10/2016 | Potter et al. | |
| 2016/0311951 A1 | 10/2016 | Reichelt et al. | |
| 2016/0311988 A1 | 10/2016 | Potter et al. | |
| 2016/0312018 A1 | 10/2016 | Vestberg et al. | |
| 2016/0312019 A1 | 10/2016 | Lampela et al. | |
| 2016/0347943 A1 | 12/2016 | Wang et al. | |
| 2016/0347944 A1 | 12/2016 | Wang et al. | |
| 2017/0009068 A1 | 1/2017 | Kahlen et al. | |
| 2017/0029980 A1 | 2/2017 | Wang et al. | |
| 2017/0137617 A1 | 5/2017 | Wang et al. | |
| 2017/0166711 A1 | 6/2017 | Boragno et al. | |
| 2017/0218172 A1 | 8/2017 | Wang et al. | |
| 2017/0313867 A1 | 11/2017 | Lampela et al. | |
| 2017/0321048 A1 | 11/2017 | Nummila-Pakarinen et al. | |
| 2018/0079875 A1 | 3/2018 | Braun et al. | |
| 2018/0112070 A1* | 4/2018 | Hiramoto | C08L 23/08 |
| 2018/0194881 A1 | 7/2018 | Denifl et al. | |
| 2018/0355076 A1* | 12/2018 | Garg | B32B 27/32 |
| 2020/0263015 A1 | 8/2020 | Kniesel et al. | |
| 2020/0270434 A1 | 8/2020 | Van Houcke et al. | |
| 2020/0277479 A1 | 9/2020 | Jerabek et al. | |
| 2020/0308353 A1 | 10/2020 | Jerabek et al. | |
| 2020/0308385 A1 | 10/2020 | Gahleitner et al. | |
| 2020/0347216 A1 | 11/2020 | Kniesel et al. | |
| 2020/0392321 A1 | 12/2020 | Gahleitner et al. | |
| 2021/0114352 A1 | 4/2021 | Oderkerk et al. | |
| 2021/0171749 A1 | 6/2021 | Kumar et al. | |
| 2021/0171750 A1 | 6/2021 | Gahleitner et al. | |
| 2021/0214527 A1 | 7/2021 | Gahleitner et al. | |
| 2021/0214533 A1 | 7/2021 | Kulshreshtha et al. | |
| 2021/0238376 A1 | 8/2021 | Kahlen et al. | |
| 2021/0253836 A1 | 8/2021 | Gahleitner et al. | |
| 2021/0269560 A1 | 9/2021 | Krallis et al. | |
| 2021/0324189 A1 | 10/2021 | Prieto et al. | |
| 2021/0332227 A1 | 10/2021 | Wang et al. | |
| 2021/0347971 A1 | 11/2021 | Wang et al. | |
| 2022/0033631 A1 | 2/2022 | Gloger et al. | |
| 2022/0135779 A1 | 5/2022 | Wang et al. | |
| 2022/0204719 A1 | 6/2022 | Vijay | |
| 2022/0251256 A1 | 8/2022 | Wang et al. | |
| 2022/0289955 A1 | 9/2022 | Kahlen et al. | |
| 2022/0306844 A1 | 9/2022 | Kahlen et al. | |
| 2022/0315716 A1 | 10/2022 | Prieto et al. | |
| 2022/0356330 A1 | 11/2022 | Kahlen et al. | |
| 2023/0046086 A1 | 2/2023 | Al-Haj Ali et al. | |
| 2023/0047329 A1 | 2/2023 | Al-Haj Ali | |
| 2023/0212338 A1 | 7/2023 | Wang et al. | |

FOREIGN PATENT DOCUMENTS

| | | | |
|---|---|---|---|
| JP | 2012162645 A * | 8/2012 |
| JP | 2017066332 A * | 4/2017 |
| WO | 03/064511 A2 | 8/2003 |
| WO | WO 2004/067610 A1 | 8/2004 |
| WO | WO 2010/072375 A1 | 7/2010 |
| WO | WO 2010/138816 A1 | 12/2010 |
| WO | WO 2011/092476 A1 | 8/2011 |
| WO | WO 2016/170016 A1 | 10/2016 |

OTHER PUBLICATIONS

Busico et al., "$^{1}$H NMR Analysis of Chain Unsaturations in Ethene/1-Octene Copolymers Prepared with Metallocene Catalysts at High Temperature," *Macromolecules 38*(16): 6988-6996 (2005).

He et al., "Unexpected proton spin-lattice relaxation in the solutions of polyolefin and tetrachloroethane," *Mag. Res. Chem. 48*(7): 537-542 (2010).

Malpas, "An Overview of Industrial Polyethylene Processes," *Introduction to Industrial Polyethylene*, John Wiley & Sons, Chapter 7, pp. 85-97 (2010).

Malpas, "Chromium Catalysts," *Introduction to Industrial Polyethylene*, John Wiley & Sons, Chapter 5, pp. 61-70 (2010).

European Patent Office, Extended European Search Report in European Patent Application No. 19183634.5 (Jan. 14, 2020).

European Patent Office, International Search Report in International Application No. PCT/EP2020/066582 (Sep. 21, 2020).

European Patent Office, Written Opinion in International Application No. PCT/EP2020/066582 (Sep. 21, 2020).

International Bureau of WIPO, International Preliminary Report on Patentability in International Application No. PCT/EP2020/066582 (Dec. 28, 2021).

U.S. Appl. No. 15/310,283, filed Nov. 10, 2016, Patented.

U.S. Appl. No. 16/761,743, filed May 5, 2020, Patented.

U.S. Appl. No. 16/761,757, filed May 5, 2020, Patented.

U.S. Appl. No. 16/652,115, filed Mar. 30, 2020, Patented.

U.S. Appl. No. 16/768,330, filed May 29, 2020, Patented.

U.S. Appl. No. 16/982,385, filed Sep. 18, 2020, Abandoned/Expired.

U.S. Appl. No. 17/047,350, filed Oct. 13, 2020, Patented.

U.S. Appl. No. 17/276,322, filed Mar. 15, 2021, Patented.

U.S. Appl. No. 17/624,609, filed Jan. 4, 2022, Patented.

U.S. Appl. No. 17/791,987, filed Jul. 11, 2022, Pending.

U.S. Appl. No. 17/792,003, filed Jul. 11, 2022, Pending.

U.S. Appl. No. 17/995,997, filed Oct. 12, 2022, Pending.

Hongfa et al., A Handbook of Industrial Assistants, *Jindun Publishing House*, pp. 330-331 (2007).

Juying et al., Quick Reference Manual for Plastic Additives Variety and Selection, *Cultural Development Press*, p. 102 (2017).

China National Intellectual Property Administration, The Second Office Action in Chinese Patent Application No. 202080047304.7 (Jun. 16, 2023).

* cited by examiner

PIPE MADE OF PEROXIDE-CROSSLINKED POLYETHYLENE OF HIGH UV STABILITY

CROSS-REFERENCE TO RELATED APPLICATIONS

This patent application is the U.S. national phase of International Application No. PCT/EP2020/066582, filed on Jun. 16, 2020, which claims the benefit of European Patent Application No. 19183634.5, filed Jul. 1, 2019, the disclosures of which are incorporated herein by reference in their entireties for all purposes.

The present invention relates to a pipe which comprises a peroxide-crosslinked ethylene homo- or copolymer and an oligomeric or polymeric sterically hindered amine.

It is known to use crosslinked polyethylene (PE-X) for the preparation of pipes. Crosslinked polyethylene can be obtained via different routes. If crosslinking is effected by the use of a peroxide, a crosslinked polyethylene referred to as "PE-Xa" is obtained. Upon thermal treatment, the peroxide decomposes to radicals which in turn abstract hydrogen atoms from the polymer chains and thereby generate carbon atom radicals within the polymer chains. Carbon atom radicals of neighbouring polymer chains may form a carbon-carbon bond and thereby connect the two polymer chains. If crosslinking is effected in the presence of a silane, a crosslinked polyethylene referred to as "PE-Xb" is obtained. Neighbouring polyethylene chains are linked via Si—O—Si bridges. If crosslinking is effected via electron beam irradiation, a crosslinked polyethylene referred to as "PE-Xc" is obtained.

External influences such as temperature, atmospheric oxygen, UV radiation, and chemical media may promote polymer degradation. For improving long-term stability of polymers, it is know to add certain additives, such as antioxidants, UV absorbers, quenchers, hindered amine light stabilizers (HALS), acid scavengers, and heat stabilizers.

WO 2004/067610 A1 describes a crosslinkable polyethylene composition in the form of pellets which may contain hindered amine light stabilizers.

WO 2010/072375 A1 relates to the use of specific additives for increasing life time of a PE pipe being in contact with chlorinated water.

CN 106633315 A describes a crosslinked polyethylene pipe being prepared from a crosslinkable composition which comprises polyethylene, a free radical photoinitiator, a multifunctional crosslinking agent, a crosslinking accelerator, and an antioxidant.

US 2010/149607 A1 relates to the use of a pipe comprising crosslinked PE for transportation of water into which chlorine dioxide has been added.

U.S. Pat. No. 6,455,616 relates to a composition which comprises (a) polyethylene; (b) as a stabilizer, 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine; and (c) an organic peroxide. The composition is used for the preparation of power cables.

WO 03/064511 A2 describes a composition comprising (a) a polyolefin which is in contact with chlorinated water, and (b) a specific stabilizer such as an epoxidized fatty acid or an organotin compound.

WO 2016/170016 A1 describes a pipe being prepared from polyethylene and a bismaleimido crosslinker.

If pipes are used for outdoor applications or pipeline construction is interrupted, the pipes might be exposed to UV light over an extended period of time, which in turn might promote polymer degradation and adversely affect pipe properties (such as mechanical properties).

An object of the present invention is to provide a pipe having improved long-term oxidative stability, in particular photo-oxidative stability.

The object is solved by a pipe, comprising a peroxide-crosslinked polyethylene, a sterically hindered amine which comprises the following repeating unit of formula (I):

(I)

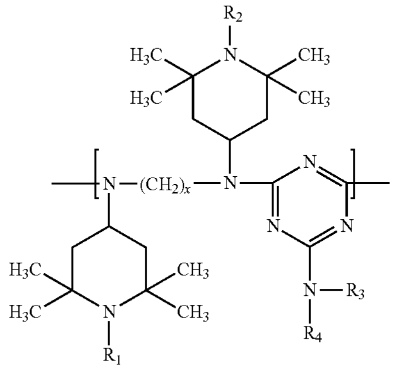

wherein x is 4-8, preferably 6, $R_1$ and $R_2$, independently from each other, are H or methyl;

$R_3$ and $R_4$, independently from each other, are H, a $C_{2-12}$ alkyl group, a $C_{5-7}$ cycloalkyl (e.g. a cyclohexyl) group, or a saturated nitrogen-containing heterocyclic group (e.g. a piperidinyl group); or $R_3$ and $R_4$, together with the nitrogen atom to which they are attached, form a 5- to 7-membered (e.g. a 6-membered) saturated nitrogen-containing heterocyclic ring.

The term "repeating unit" means that the sterically hindered amine comprises at least two of these units of Formula (I). Accordingly, the sterically hindered amine is an oligomeric or polymeric sterically hindered amine.

Oligomeric or polymeric sterically hindered amines comprising the repeating unit of formula (I) are commercially available or can be prepared by methods which are known to the skilled person.

Due to the presence of the sterically hindered amine, which comprises the repeating unit of formula (I), in the peroxide-crosslinked polyethylene, a pipe of improved long-term oxidative stability, in particular photo-oxidative stability is provided.

Preferably, $R_3$ is a $C_{2-12}$ alkyl group, and $R_4$ is H or a saturated nitrogen-containing heterocyclic group (such as a substituted or unsubstituted piperidinyl group).

If $R_3$ and $R_4$, together with the nitrogen atom to which they are attached, form a 5- to 7-membered, in particular a 6-membered saturated nitrogen-containing heterocyclic ring, this might be a morpholine ring.

In a preferred embodiment, x is 6, $R_1$ and $R_2$ are H; $R_3$ is $C_4$ alkyl; and $R_4$ is 2,2,6,6-tetramethyl-piperidinyl. According to another preferred embodiment, x is 6, $R_1$ and $R_2$ are H; $R_3$ is H; and $R_4$ is $C_8$ alkyl.

The sterically hindered amine may have a number average molecular weight $M_n$ of e.g. 1000 g/mol to 5000 g/mol, more preferably 1500 g/mol to 4000 g/mol. The molecular weight can be determined via GPC.

Preferably, the sterically hindered amine is poly((6-((1,1,3,3-tetramethylbutyl)amino)-1,3,5-triazine-2,4-diyl)((2,2,6,6-tetramethyl-4-piperidinyl)imino)-1,6-hexanediyl((2,2,6,6-tetramethyl-4-piperidinyl)imino)), CAS number 71878-19-8; or 1,6-hexanediamine, N,N'-bis(2,2,6,6-tetramethyl-4-piperidinyl)-, polymer with 2,4,6-trichloro-1,3,5-triazine, reaction products with, N-butyl-1-butanamine and N-butyl-2,2,6,6-tetramethyl-4-piperidinamine, CAS number 192268-64-7; or a mixture of these two sterically hindered amines.

Poly((6-((1,1,3,3-tetramethylbutyl)amino)-1,3,5-triazine-2,4-diyl)((2,2,6,6-tetramethyl-4-piperidinyl)imino)-1,6-hexanediyl((2,2,6,6-tetramethyl-4-piperidinyl)imino)), CAS number 71878-19-8, is commercially available as Chimassorb® 944, and has the following chemical structure:

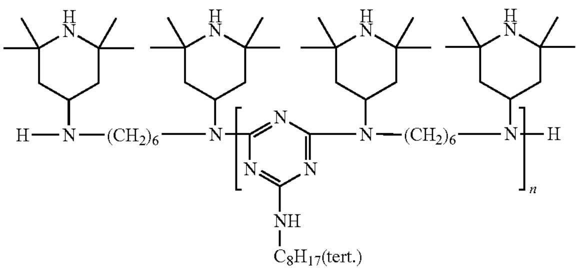

1,6-Hexanediamine, N,N'-bis(2,2,6,6-tetramethyl-4-piperidinyl)-, polymer with 2,4,6-trichloro-1,3,5-triazine, reaction products with, N-butyl-1-butanamine and N-butyl-2,2,6,6-tetramethyl-4-piperidinamine, CAS number 192268-64-7, is commercially available as Chimassorb® 2020, and has the following chemical structure:

(such as propylene, 1-butene, 1-hexene, and/or 1-octene) and/or a non-conjugated diene (such as 1,5-hexadiene; 1,7-octadiene; 1,9-decadiene; 1,11-dodecadiene; and/or 7-methyl-1,6-octadiene). The ethylene copolymer may comprise comonomer units (i.e. units which are not derived from ethylene) in an amount of up to 15 wt %, more preferably up to 10 wt %, e.g. 0.5 to 15 wt %, more preferably 0.5 to 10 wt %.

The crosslinkable polyethylene can have a melt flow rate MFR (190° C./21.6 kg), measured according to ISO 1133, of from 0.1 g/10 min to 100 g/10 min, more preferably 1 g/10 min to 50 g/10 min, even more preferably 1 g/10 min to 30 g/10 min; and/or a density, measured according to ISO 1183-1: method A, of from 920 kg/m$^3$ to 973 kg/m$^3$, more preferably 935 kg/m$^3$ to 965 kg/m$^3$.

The crosslinkable polyethylene may contain terminal vinyl groups (R—CH═$CH_2$) in a number of 0.05/1000 carbon atoms to 2.5/1000 carbon atoms, more preferably 0.1/1000 carbon atoms to 1.5/1000 carbon atoms, measured by NMR as described further below.

The crosslinkable polyethylene may contain a total number of internal vinylidene groups (RR'C═$CH_2$), internal cis-vinylene groups (E-RCH═CHR'), internal trans-vinylene groups (Z—RCH═CHR') and internal trisubstituted vinylene groups (RCH═CR'R") per 1000 carbon atoms, measured by NMR as described further below, of less than 0.2, more preferably less than 0.1 or even less than 0.05.

The ratio of the number of terminal vinyl groups per 1000 carbon atoms to the total number of internal vinylidene groups, internal cis-vinylene groups, internal trans-vinylene groups and internal trisubstituted vinylene groups per 1000 carbon atoms might be at least 10:1, more preferably at least 40:1.

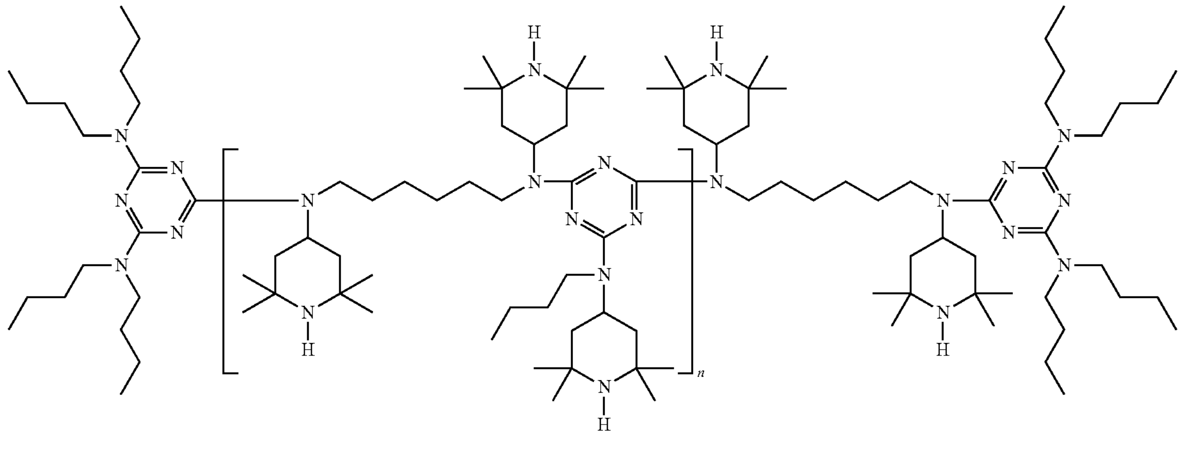

The concentration of the sterically hindered amine in the peroxide-crosslinked polyethylene may vary over a broad range. In an exemplary embodiment, the sterically hindered amine comprising the repeating unit of formula (I) is present in an amount of 0.01 wt % to 1 wt %, based on the amount of the peroxide-crosslinked polyethylene.

The peroxide-crosslinked polyethylene is obtained from a crosslinkable polyethylene by a peroxide treatment which is commonly known to the skilled person.

The polyethylene can be an ethylene homo- or copolymer.

If the polyethylene is an ethylene copolymer, it may comprise comonomer units derived from a $C_{3-8}$ alpha-olefin After peroxide crosslinking, the peroxide-crosslinked polyethylene may have a degree of crosslinking of at least 65%, more preferably at least 70%, e.g. 65% to 85%, more preferably 70% to 80%, measured according to ASTM D2765-95.

In principle, the peroxide-crosslinked ethylene homo- or copolymer might be obtained by a crosslinking treatment with a peroxide and at least one non-peroxide crosslinking agent. However, in a preferred embodiment, the peroxide-crosslinked ethylene homo- or copolymer is obtained by a crosslinking treatment with a peroxide in the absence of any non-peroxide crosslinking agent.

In addition to the sterically hindered amines described above, the crosslinked polyethylene of the pipe may comprise further additives, such as antioxidants, stabilizers, pigments, lubricants, and/or antistatic agents. These additives are known to the skilled person. If present, the antioxidant is preferably a phenolic antioxidant such as pentaerythrityl tetrakis-3-(3',5'-di-tert-butyl-4-hydroxyphenyl) proionate, CAS number 6683-19-8 (commercially available as Irganox® 1010 from BASF); octadecyl-3-(3',5'-di-tert-butyl-4'-hydroxyphenyl)propionate, CAS No. 2082-79-3 (commercially available as Irganox® 1076 from BASF); and/or 1,3,5-trimethyl-2,4,6-tris-(3,5-di-tert-butyl-4-hydroxybenzyl)benzene, CAS number 1709-70-2 (commercially available as Irganox® 1330 from BASF). The crosslinked polyethylene may contain the one or more antioxidants in a total amount of from 0.05 wt % to 5 wt %, more preferably 0.1 wt % to 3 wt %. The crosslinked polyethylene may contain just one antioxidant or may contain two or more antioxidants. In an exemplary embodiment, the crosslinked polyethylene comprises pentaerythrityl tetrakis-3-(3',5'-di-tert-butyl-4-hydroxyphenyl) propionate (CAS number 6683-19-8); octadecyl-3-(3',5'-di-tert-butyl-4'-hydroxyphenyl)propionate (CAS No. 2082-79-3), and 1,3,5-trimethyl-2,4,6-tris-(3,5-di-tert-butyl-4-hydroxybenzyl)benzene (CAS number 1709-70-2). The amounts of these three antioxidants in the crosslinked polyethylene might be as follows: 0.05 to 0.5 wt %, more preferably 0.1 to 0.3 wt % of pentaerythrityl tetrakis-3-(3',5'-di-tert-butyl-4-hydroxyphenyl) propionate; 0.03 to 0.45 wt %, more preferably 0.08 to 0.35 wt % of octadecyl-3-(3',5'-di-tert-butyl-4'-hydroxyphenyl)propionate; and 0.15 to 0.7 wt %, more preferably 0.25 to 0.65 wt % of 1,3,5-trimethyl-2,4,6-tris-(3,5-di-tert-butyl-4-hydroxybenzyl)benzene.

The present invention also relates to a process for preparing the pipe as described above, wherein a crosslinkable composition comprising a crosslinkable polyethylene, a peroxide, a sterically hindered amine which comprises the following repeating unit of formula (I):

(I)

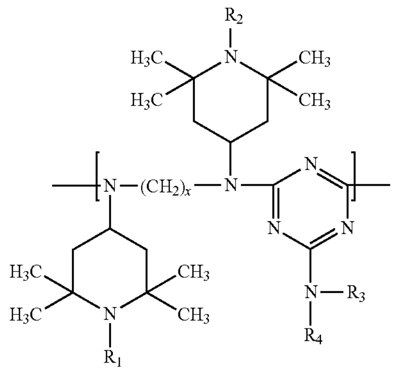

wherein x is 4-8, preferably 6, $R_1$ and $R_2$, independently from each other, are H or methyl;

$R_3$ and $R_4$, independently from each other, are H, a $C_{2-12}$ alkyl group, a $C_{5-7}$ cycloalkyl (e.g. a cyclohexyl) group, or a saturated nitrogen-containing heterocyclic group (e.g. a piperidinyl group); or $R_3$ and $R_4$, together with the nitrogen atom to which they are attached, form a 5- to 7-membered (e.g. a 6-membered) saturated nitrogen-containing heterocyclic ring, is provided and formed to a pipe and the polyethylene is crosslinked.

With regard to the preferred properties of the sterically hindered amine, reference can be made to the statements already provided above.

As already mentioned above, the polyethylene can be an ethylene homo- or copolymer. If the polyethylene is an ethylene copolymer, it may comprise comonomer units derived from a $C_{3-8}$ alpha-olefin (such as propylene, 1-butene, 1-hexene, and/or 1-octene) and/or a non-conjugated diene (such as 1,5-hexadiene; 1,7-octadiene; 1,9-decadiene; 1,11-dodecadiene; and/or 7-methyl-1,6-octadiene). The crosslinkable ethylene copolymer may comprise comonomer units (i.e. units which are not derived from ethylene) in an amount of up to 15 wt %, more preferably up to 10 wt %, e.g. 0.5 to 15 wt %, more preferably 0.5 to 10 wt %.

The crosslinkable polyethylene can have a melt flow rate MFR (190° C./21.6 kg), measured according to ISO 1133, of from 0.1 g/10 min to 100 g/10 min, more preferably 1 g/10 min to 50 g/10 min, even more preferably 1 g/10 min to 30 g/10 min; and/or a density, measured according to ISO 1183/1872-2B, of from 920 $kg/m^3$ to 973 $kg/m^3$, more preferably 935 $kg/m^3$ to 965 $kg/m^3$.

As already indicated above, the crosslinkable polyethylene may contain number of terminal vinyl groups ($R—CH{=}CH_2$) per 1000 carbon atoms of 0.05 to 2.5, more preferably 0.1 to 1.5, measured by NMR as described further below.

The crosslinkable polyethylene may contain a total number of internal vinylidene groups ($RR'C{=}CH_2$), internal cis-vinylene groups ($E-RCH{=}CHR'$), internal trans-vinylene groups ($Z—RCH{=}CHR'$) and internal trisubstituted vinylene groups ($RCH{=}CR'R''$) per 1000 carbon atoms, measured by NMR as described further below, of less than 0.2, more preferably less than 0.1 or even less than 0.05.

In the crosslinkable polyethylene, the ratio of the number of terminal vinyl groups per 1000 carbon atoms to the total number of internal vinylidene groups, internal cis-vinylene groups, internal trans-vinylene groups and internal trisubstituted vinylene groups per 1000 carbon atoms might be at least 10:1, more preferably at least 40:1.

Such a crosslinkable polyethylene is commercially available or obtainable by commonly known preparation methods. The crosslinkable polyethylene might be prepared in the presence of a chromium catalyst, a Ziegler-Natta catalyst or a metallocene catalyst. These types of catalysts are commonly known to the skilled person. For example, chromium catalysts are described in Chapter 5 of the textbook "*Introduction to Industrial Polyethylene*" (D. B. Malpass; "*Introduction to Industrial Polyethylene*", Chapter 5*: "Chromium Catalysts*", pp. 61-70, John Wiley & Sons, 2010). An exemplary chromium catalyst is chromocene which is preferably provided on a solid support such as silica (see e.g. Section 5.4 of Chapter 5 of said textbook). However, other Chromium-based catalysts might be used as well.

Appropriate process conditions for preparing polyethylene are commonly known to the skilled person, see e.g. Chapter 7 of the above-referenced textbook of D. B. Malpass (D. B. Malpass; "*Introduction to Industrial Polyethylene*", Chapter 7*: "An Overview of Industrial Polyethylene Processes*" pp. 85-97, John Wiley & Sons, 2010). Just as an example, the polyethylene might be prepared via a gas phase process as described in Section 7.4 of Chapter 7 of said textbook. However, other processes or a combination of two different types of processes might be used as well. The polyethylene might be prepared in a single reactor or at least two reactors used in series or in parallel.

Appropriate peroxides, in particular organic peroxides, by which crosslinking of polyethylene can be effected are known to the skilled person. One or more of the following organic peroxides might be used:

Dicumyl peroxide, benzoyl peroxide, dichlorobenzoyl peroxide, di-tert-butylperoxide, 2,5-dimethyl-2,5di(peroxy-benzoate), hexyne-3,1,4-bis(tert-butylperoxyisopropyl)benzene, lauroyl peroxide, tert-butyl peracetate, tert-butyl perbenzoate, 2,5-dimethyl-2,5-di(tert-butylperoxy)hexane, 2,5-dimethyl-2,5-di(tert-butylperoxy)hexyne and tert-butylperphenyl acetate.

In principle, the crosslinkable composition may additionally comprise a non-peroxide crosslinking agent. However, in a preferred embodiment, crosslinking is effected in the absence of a non-peroxide crosslinking agent.

The crosslinkable composition might be provided by preparing pellets which contain the polyethylene and the sterically hindered amine, followed by bringing the pellets into contact with the peroxide (e.g. by soaking the pellets in liquid peroxide or in a liquid containing dissolved peroxide).

In line with WO 2004/067610, it might be preferred that the pellets have an average particle size of less than 0.020 $cm^3$, a number of pellets per gram of more than 73, and/or a bulk density of about 550 $kg/m^3$.

The pipe might be formed by methods which are commonly known to the skilled person, such as extrusion, in particular screw extrusion or ram extrusion.

Appropriate treatment conditions by which decomposition of the peroxide and crosslinking of the polyethylene can be initiated are known to the skilled person. Crosslinking of the polyethylene might be accomplished by thermal treatment (e.g. at a temperature of 200-260° C.).

In the process of the present invention, forming the pipe and crosslinking might be carried out successively or may overlap in time. Just as an example, the crosslinkable composition can be formed to a pipe (e.g. by extrusion) under conditions at which crosslinking is substantially avoided, followed by thermal treatment of the non-cross-linked pipe (e.g. in an infrared oven) so as to obtain a crosslinked pipe (i.e. a pipe containing crosslinked polyethylene). Alternatively, crosslinking of the polyethylene may already start during the pipe extrusion step, optionally followed by a thermal post-treatment of the extruded pipe.

The present invention also relates to the use of the pipe as described above for transportation of water (e.g. chlorine-containing water or water to which chlorine dioxide has been added).

Measuring Methods

The following measuring methods are applied in the present invention.

Melt Flow Rate (MFR)

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

Density

Density of the polymer was measured according to ISO 1183/1872-2B.

Oxygen Induction Time (OIT)

The OIT test is performed according to ASTM D3895, and uses a Differential Scanning calorimeter (DSC). A sample with a diameter of 3 mm and a weight of 10 mg of the material to be tested is introduced into the DSC at room temperature, and the sample is heated to a pre-defined temperature (220° C., alternatively to 210° C. or 200° C.) under a nitrogen atmosphere. As soon as the pre-defined maximum temperature (e.g. 220° C.) is reached, the cell is maintained under isothermal conditions, and the gas is changed from nitrogen to oxygen. The flow rate of the oxygen is maintained at 50 $cm^3$/min. Under these conditions, the stabilizer is consumed over time until it is totally depleted. At this point, the polymer sample degrades or oxidizes, thereby liberating additional heat (exotherm reaction). The time it takes for this exotherm reaction to appear from the time that the oxygen is introduced is reported as the OIT time, and is a measure of the oxidative stability of the material.

Cross-Linking Degree

Cross-linking degree was determined according to ASTM D2765-01, method A, by using decalin as solvent. The samples were taken from the cross-section of the pipe or pipe layer.

Content of Comonomer Units Derived from an Alpha-Olefin

Comonomer content was determined in a known manner based on Fourier transform infrared spectroscopy (FTIR).

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. For each sample and calibration sample at least two films were prepared. The films were pressed from pellets by using a Graceby Specac film press at 150° C. using 3+2 minutes preheating time, 1 minute compression time and 4 to 5 minutes cooling time.

The comonomer content was determined from the absorbance at the wave number of approximately 1378 $cm^{-1}$. The comonomer used in the calibration samples was the same as the comonomer present in the samples. The analysis was performed by using the resolution of 2 $cm^{-1}$, wave number span of from 4000 to 400 $cm^{-1}$ and the number of sweeps of 128. At least two spectra were run from each film.

The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.

From the calibration samples a straight line is obtained as follows:

$$C_i = k \cdot \frac{A_{1378,i}}{s_i} + b$$

where $C_i$ is the comonomer content of the calibration sample i, $A_{1378,i}$ is the absorbance at approximately 1378 $cm^{-1}$ of sample i, $s_i$ is the thickness of the film made of calibration sample i, k is the slope of the calibration line (obtained by regression analysis), and b is the intercept of the calibration line (obtained by regression analysis).

By using the thus obtained parameters k and b, the comonomer content of the samples were obtained from $$C_x = k \cdot \frac{A_{1378,x}}{s_x} + b$$

where $C_x$ is the comonomer content of the unknown sample, $A_{1378,x}$ is the absorbance at approximately 1378 $cm^{-1}$ of the unknown sample, $s_x$ is the thickness of the film made of the unknown sample, k is the slope of the calibration line obtained from the calibration samples as above, b is the intercept of the calibration line obtained from the calibration samples.

Content of Comonomer Units Derived from a Non-Conjugated Diene

Quantitative infrared (IR) spectroscopy was used to quantify the amount of carbon-carbon double bonds (C═C). Calibration was achieved by determination of the molar extinction coefficient of the C═C groups in representative low molecular weight model compounds of know structure.

The amount of each of these groups (N) was determined as number of carbon-carbon double bonds per thousand total carbon atoms (C═C/1000C) via:

$$N = (A \times 14)/(E \times L \times D),$$

where A is the maximum absorbance defined as peak height, E the molar extinction coefficient of the group in question ($1 \cdot mol^{-1} \cdot mm^{-1}$), L the film thickness (mm) and D the density of the material ($g \cdot cm^{-3}$).

The amount of C═C bonds originating solely from the diene comonomers was determined via their characteristic absorption and a reference material. The reference material was produced under comparable conditions to the material being analysed except for the lack of diene-derived comonomer units. The amount of C═C bonds per thousand total carbon atoms originating from only the diene-derived comonomer units was calculated through subtraction of N for the reference material from N for the polyethylene with diene-derived comonomer units.

Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 $cm^{-1}$.

The molar extinction coefficient (E) was determined as $1 \cdot mol^{-1} \cdot mm^{-1}$ via:

$$E = A/(C \times L)$$

where A is the maximum absorbance defined as peak height, C the concentration ($mol \cdot l^{-1}$) and L the cell thickness (mm).

At least three 0.18 $mol \cdot l^{-1}$ solutions in carbon disulphide ($CS_2$) were used and the mean value of the molar extinction coefficient was used.

Amount of Carbon-Carbon Double Bonds

Quantitative nuclear-magnetic resonance (NMR) spectroscopy was used to quantify the content of terminal vinyl groups (R—CH═$CH_2$), internal vinylidene groups (RR'C═$CH_2$), internal cis-vinylene groups (E-RCH═CHR'), internal trans-vinylene groups (Z—RCH═CHR') and internal trisubstituted vinylene groups (RCH═CR'R") of the polyethylene.

Quantitative $^1H$ NMR spectra were recorded in the solution-state using a Bruker Avance III 400 NMR spectrometer operating at 400.15 MHz. All spectra were recorded using a $^{13}C$ optimised 10 mm selective excitation probehead at 125° C. using nitrogen gas for all pneumatics. Approximately 250 mg of material was dissolved in 1,2-tetrachloroethane-$d_2$ (TCE-$d_2$) using approximately 3 mg of Hostanox 03 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups (He, Y., Qiu, X, and Zhou, Z., Mag. Res. Chem. 2010, 48, 537-542; Busico, V. et. al. Macromolecules, 2005, 38 (16), 6988-6996). All chemical shifts were indirectly referenced to TMS at 0.00 ppm using the signal resulting from the residual protonated solvent at 5.95 ppm.

Characteristic signals corresponding to the presence of terminal vinyl groups (R—CH═$CH_2$) were observed and the amount quantified using the integral of the two coupled inequivalent terminal $CH_2$ protons (Va and Vb) at 4.95, 4.98 and 5.00 and 5.05 ppm accounting for the number of reporting sites per functional group:

$$Nvinyl = IVab/2$$

When characteristic signals corresponding to the presence of internal vinylidene groups (RR'C═CH2) were observed, the amount is quantified using the integral of the two $CH_2$ protons (D) at 4.74 ppm accounting for the number of reporting sites per functional group:

$$Nvinylidene = ID/2$$

When characteristic signals corresponding to the presence of internal cis-vinylene groups (E-RCH═CHR'), or related structure, were observed, the amount is quantified using the integral of the two CH protons (C) at 5.39 ppm accounting for the number of reporting sites per functional group:

$$Ncis = IC/2$$

When characteristic signals corresponding to the presence of internal trans-vinylene groups (Z—RCH═CHR') were observed, the amount is quantified using the integral of the two CH protons (T) at 5.45 ppm accounting for the number of reporting sites per functional group:

$$Ntrans = IT/2$$

When characteristic signals corresponding to the presence of internal trisubstituted-vinylene groups (RCH═CR'R"), or related structure, were observed, the amount is quantified using the integral of the CH proton (Tris) at 5.14 ppm accounting for the number of reporting sites per functional group:

$$Ntris = ITris$$

The Hostanox 03 stabliser was quantified using the integral of multiplet from the aromatic protons (A) at 6.92, 6.91, 6.69 and at 6.89 ppm and accounting for the number of reporting sites per molecule:

$$H = IA/4$$

As is typical for unsaturation quantification in polyolefins the amount of unsaturation was determined with respect to total carbon atoms, even though quantified by $^{1}H$ NMR spectroscopy. This allows direct comparison to other microstructure quantities derived directly from $^{13}C$ NMR spectroscopy.

The total amount of carbon atoms was calculated from integral of the bulk aliphatic signal between 2.85 and −1.00 ppm with compensation for included methyl signals of the stabiliser as well as excluded unsaturated derived sites $$NCtotal = (Ibulk - 42*H)/2 + 2*Nvinyl + 2*Nvinylidene + 2*Ncis + 2*Ntrans + 2*Ntris$$

The content of unsaturated groups (U) was calculated as the number of unsaturated groups in the polymer per thousand total carbons (kCHn):

$$U = 1000*N/NCtotal$$

The total amount of unsaturated groups was calculated as the sum of the individual observed unsaturated groups and thus also reported with respect per thousand total carbons:

$$Utotal = Uvinyl + Uvinylidene + Ucis + Utrans + Utris$$

The relative content of a specific unsaturated group (U) is reported as the fraction or percentage of a given unsaturated group with respect to the total amount of unsaturated groups:

$$[U] = Ux/Utotal$$

The present invention is described in further detail by the following Examples.

EXAMPLES

In Inventive Examples IE1-IE2, and Comparative Example CE1, pellets were prepared by extrusion from the compositions outlined below in Table 1. Each of the pellet compositions was made of a polyethylene, phenolic antioxidants, and a sterically hindered amine ("HALS"). The polyethylene of IE1-IE2 and CE1 had an MFR (190° C., 21.6 kg) of 9 g/10 min, a density of 952 kg/m$^3$, and 0.47 terminal vinyl groups/1000 carbon atoms. No internal vinylidene groups (RR'C═$CH_2$), internal cis-vinylene groups (E-RCH═CHR'), internal trans-vinylene groups (Z—RCH═CHR') and internal trisubstituted vinylene groups (RCH═CR'R") were detected.

The pellet compositions only differed in the type of sterically hindered amine.

Inventive Example 1: Chimassorb® 944

Inventive Example 2: Chimassorb® 2020

Comparative Example 1: Sabostab® UV62

TABLE 1

Pellet compositions used for preparing the pipes

| | IE1 | IE3 | CE1 |
|---|---|---|---|
| Sterically hindered amine | 0.2 wt % Chirnassorb ® 944 | 0.2 wt % Chirnassorb ® 2020 | 0.2 wt % Sabostab ® UV 62 |
| Polymer | 99.05 wt % Polyethylene; $MFR_{21}$: 9 g/10 min; Density: 952 kg/m$^3$ | | |
| Phenolic AOs | 0.2 wt % Irganox ® 1010<br>0.15 wt% Irganox ® 1076<br>0.4 wt % Irganox ® 1330 | | |

As already indicated above, the sterically hindered amines of Chimassorb® 944 and Chimassorb® 2020 have the following chemical structures:

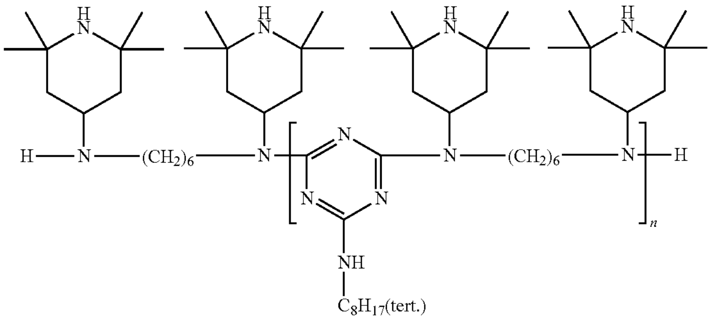

Chimassorb® 944
(CAS No. 71878-19-8)

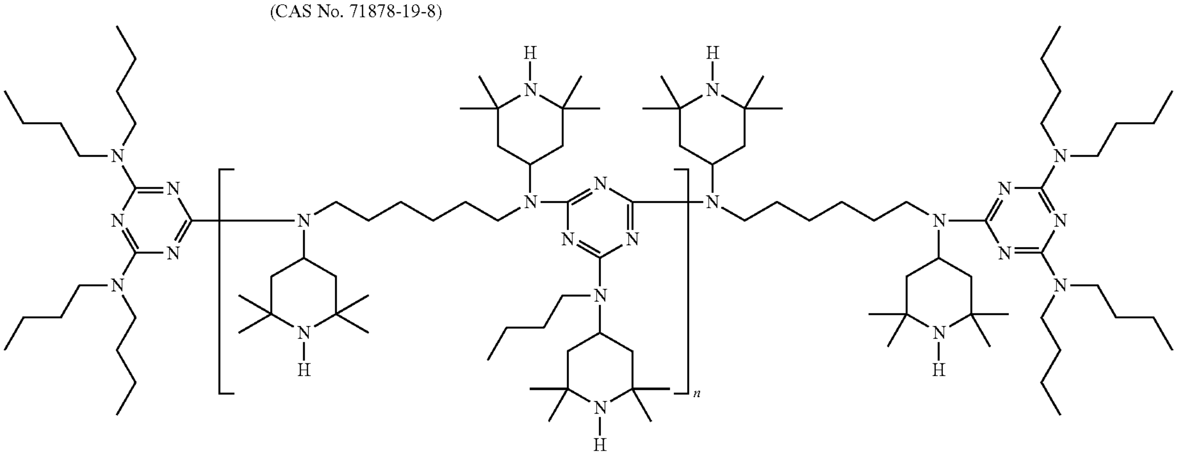

Chimassorb® 2020
(CAS No. 192268-64-7)

The sterically hindered amine of Sabostab® UV 62 is butanedioic acid, 1,4-dimethyl ester, polymer with 4-hydroxy-2,2,6,6-tetramethyl-1-piperidineethanol; CAS No. 65447-77-0, molecular weigh Mn of about 3100-4000 g/mol, and has the following repeating unit:

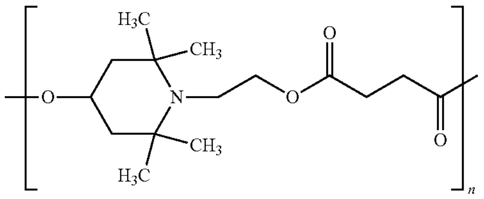

Irganox® 1010: Pentaerythrityl tetrakis-3-(3',5'-di-tert-butyl-4-hydroxyphenyl) proionate, CAS number 6683-19-8

Irganox® 1076: Octadecyl-3-(3',5'-di-tert-butyl-4'-hydroxyphenyl)propionate, CAS No. 2082-79-3

Irganox® 1330: 1,3,5-Trimethyl-2,4,6-tris(3,5-di-tert-butyl-4-hydroxybenzyl)benzene; CAS No. 1709-70-2

The pellets of IE1-IE2 and CE1 were soaked with the same amount and type of organic peroxide (3,3,5,7,7-pentamethyl-1,2,4-trioxepane, Trigonox® 311), extruded under identical conditions to a pipe, and the polyethylene of each pipe was crosslinked under identical conditions, thereby obtaining crosslinked pipes.

The degree of crosslinking of the crosslinked pipes is shown in Table 2.

TABLE 2

| Degree of crosslinking | | | |
|---|---|---|---|
| | IE1 | IE2 | CE1 |
| Degree of crosslinking [%] | 70 | 71 | 70 |

For the assessment of photo-oxidative stability, both the non-crosslinked pellet compositions and the crosslinked pipe compositions were subjected to a weathering treatment, and the treated materials were subjected to oxidation induction time (OIT) tests after pre-defined periods of treatment.

The weathering treatment was subjected under the following conditions:

Artificial weathering—Xenon arc sources according to ISO 4892-1:1999(E) and ISO 4892-2:1994 (E)

Exposure according Kalahari standard,

Specimens that fit 60×120 mm clamping;

Spectral range in nm: Kalahari 300-400;

Irradiation: 75 W/m$^2$

Black standard temperature: 90° C.

Humidity: 20%

The pipe segments were mounted on a specimen holder. The outer side of the pipe was irradiated. The measurements were done on the weathered side of the pipe.

The OIT test results of both the non-crosslinked and the crosslinked samples are summarized below in Tables 3 and 4.

TABLE 3

OIT tests carried out on non-crosslinked samples

| | | IE1 | IE2 | CE1 |
|---|---|---|---|---|
| OIT [min], Heating to 220° C. | No weathering | 83.5 | 90.6 | 40.2 |
| | Weathering for 120 hours | 36.7 | 43.7 | 17.5 |
| | Weathering for 336 hours | 11.3 | 17.1 | 4.4 |
| | Weathering for 650 hours | 6.1 | 4.4 | 2.2 |
| OIT [min], Heating to 200° C. | Weathering for 650 hours | 50.5 | 98.9 | 26.5 |
| | Weathering for 1000 hours | 59 | 71.6 | 16.3 |

The longer the non-crosslinked polyethylene compositions are subjected to the weathering treatment, the lower is oxidation induction time. However, due to the presence of a sterically hindered amine comprising the repeating unit of formula (I), the reduction in OIT is significantly less in IE1-IE2 if compared to CE1.

Accordingly, the non-crosslinked polyethylene compositions of IE1-IE2 show improved photo-oxidative stability.

TABLE 4

OIT tests carried out on crosslinked samples

| | | IE1 | IE2 | CE1 |
|---|---|---|---|---|
| OIT [min], Heating to 220° C. | No weathering | 55.4 | 70.9 | 11 |
| | Weathering for 120 hours | 22.4 | 45.4 | 6.6 |
| | Weathering for 336 hours | 16.2 | 18.3 | 3.4 |

Just like the non-crosslinked polyethylene samples, the crosslinked polyethylene samples of IE1-IE2 show significantly higher OIT values if compared to CE1. Furthermore, if crosslinked, the polyethylene compositions of IE1-IE2 show a smaller decrease in OIT as a function of weathering period. Just as an example, while OIT (220° C.) of the non-crosslinked sample of IE2 decreases by 52% after a weathering treatment of 120 hours, the crosslinked sample of IE2 shows a decrease of OIT (220° C.) of only 36% after a weathering treatment of 120 hours.

The invention claimed is:

1. A pipe comprising a peroxide-crosslinked polyethylene, wherein the peroxide-crosslinked polyethylene is obtained from a crosslinkable polyethylene by a crosslinking treatment with a peroxide in the absence of any non-peroxide crosslinking agent, wherein the crosslinkable polyethylene is an ethylene homopolymer or an ethylene copolymer with comonomer units derived from a $C_{3-8}$ alpha-olefin and/or a non-conjugated diene, 0.1 to 0.3 wt % of pentaerythritol tetrakis-3-(3',5'-di-tert-butyl-4-hydroxyphenyl) propionate (CAS number 6683-19-8), 0.08 to 0.35 wt % octadecyl-3-(3',5'-di-tert-butyl-4-hydroxyphenyl) propionate (CAS No. 2082-79-3), and 0.25 to 0.65 wt % of 1,3,5-trimethyl-2,4,6-tris-(3,5-di-tert-butyl-4-hydroxy benzyl) benzene (CAS number 1709-70-2), and a sterically hindered amine which comprises the following repeating unit of formula (I):

(I)

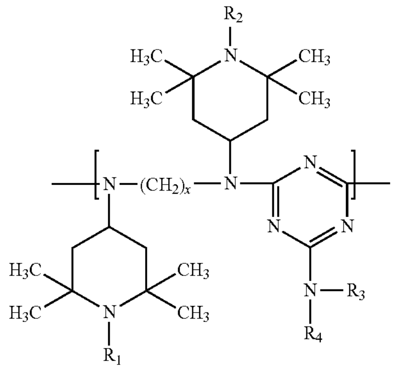

wherein x is 4-8, $R_1$ and $R_2$, independently from each other, are H or methyl; and $R_3$ and $R_4$, independently from each other, are H, a $C_{2-12}$ alkyl group, a $C_{5-7}$ cycloalkyl group, or a saturated nitrogen-containing heterocyclic group; or $R_3$ and $R_4$, together with the nitrogen atom to which they are attached, form a 5- to 7-membered saturated heterocyclic ring.

2. The pipe according to claim 1, wherein x is 6, $R_3$ is a $C_{2-12}$ alkyl group, and $R_4$ is H or a saturated nitrogen-containing heterocyclic group.

3. The pipe according to claim 1, wherein the sterically hindered amine is poly ((6-((1,1,3,3-tetramethylbutyl) amino)-1,3,5-triazine-2,4-diyl)((2,2,6,6-tetramethyl-4-piperidinyl) imino)-1,6-hexanediyl ((2.2.6.6-tetramethyl-4-piperidinyl) imino)); 1,6-hexanediamine, N,N'-bis(2,2,6,6-tetramethyl-4-piperidinyl)-, polymer with 2,4,6-trichloro-1,3,5-triazine, reaction products with N-butyl-1-butanamine and N-butyl-2,2,6,6-tetramethyl-4-piperidinamine; or a mixture thereof.

4. The pipe according to claim 1, wherein the sterically hindered amine is present in an amount of 0.01 wt % to 1 wt %, based on the weight of the peroxide-crosslinked polyethylene.

5. A process for preparing the pipe according to claim 1, which comprises providing a crosslinkable composition comprising a crosslinkable polyethylene, which is an ethylene homopolymer or an ethylene copolymer with comonomer units derived from a $C_{3-8}$ alpha-olefin and/or a non-conjugated diene, a peroxide, antioxidants pentaerythritol tetrakis-3-(3',5'-di-tert-butyl-4-hydroxyphenyl) propionate (CAS number 6683-19-8), octadecyl-3-(3',5'-di-tert-butyl-4-hydroxyphenyl) propionate (CAS No. 2082-79-3), and 1,3,5-trimethyl-2,4,6-tris-(3,5-di-tert-butyl-4-hydroxybenzyl) benzene (CAS number 1709-70-2), and a sterically hindered amine which comprises the following unit of formula (I);

(I)

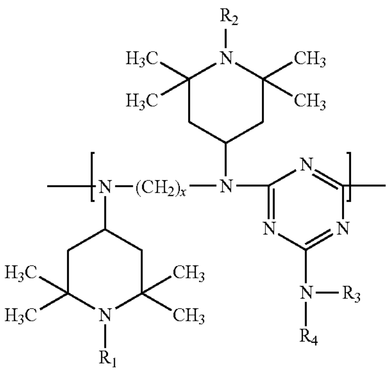

forming the crosslinkable composition into a pipe, and crosslinking the crosslinkable polyethylene by a crosslinking treatment with the peroxide in the absence of any non-peroxide crosslinking agent.

6. The process according to claim 5, wherein the crosslinkable composition is provided by preparing pellets which contain the crosslinkable polyethylene, the antioxidants, and the sterically hindered amine, and the pellets are brought into contact with the peroxide.

7. The process according to claim 5, wherein the pipe is formed by extrusion.

8. A method of transporting water comprising transporting water through the pipe according to claim 1.

9. The process according to claim 5, wherein the pipe is formed by screw extrusion or ram extrusion.

10. The pipe according to claim 1, wherein the crosslinkable polyethylene is prepared in the presence of a chromium catalyst, a Ziegler-Natta catalyst, or a metallocene catalyst.

11. The process according to claim 5, wherein the crosslinkable polyethylene is prepared in the presence of a chromium catalyst, a Ziegler-Natta catalyst, or a metallocene catalyst.

12. The pipe according to claim 1, wherein the crosslinkable polyethylene has a melt flow rate MFR (190° C./21.6 kg), measured according to ISO 1133 of from 1 g/10 min to 50 g/10 min, a density measured according to ISO 1183-1: method A, of from 935 $kg/m^3$ to 965 $kg/m^3$, and 0.05 terminal vinyl groups/1000 carbon atoms to 2.5 terminal vinyl groups/1000 carbon atoms.

13. The process according to claim 5, wherein the crosslinkable polyethylene has a melt flow rate MFR (190° C./21.6 kg), measured according to ISO 1133 of from 1 g/10 min to 50 g/10 min, a density measured according to ISO 1183-1: method A, of from 935 $kg/m^3$ to 965 $kg/m^3$, and 0.05 terminal vinyl groups/1000 carbon atoms to 2.5 terminal vinyl groups/1000 carbon atoms.

14. The process according to claim 5, wherein the sterically hindered amine further comprises poly ((6-((1,1,3,3-tetramethylbutyl) amino)-1,3,5-triazine-2,4-diyl) ((2,2,6,6-tetramethyl-4-piperidinyl) imino)-1,6-hexanediyl ((2,2,6,6-tetramethyl-4-piperidinyl) imino)).

* * * * *